Sept. 12, 1933.   A. M. HARKNESS   1,926,995
FILTER
Filed May 4, 1931
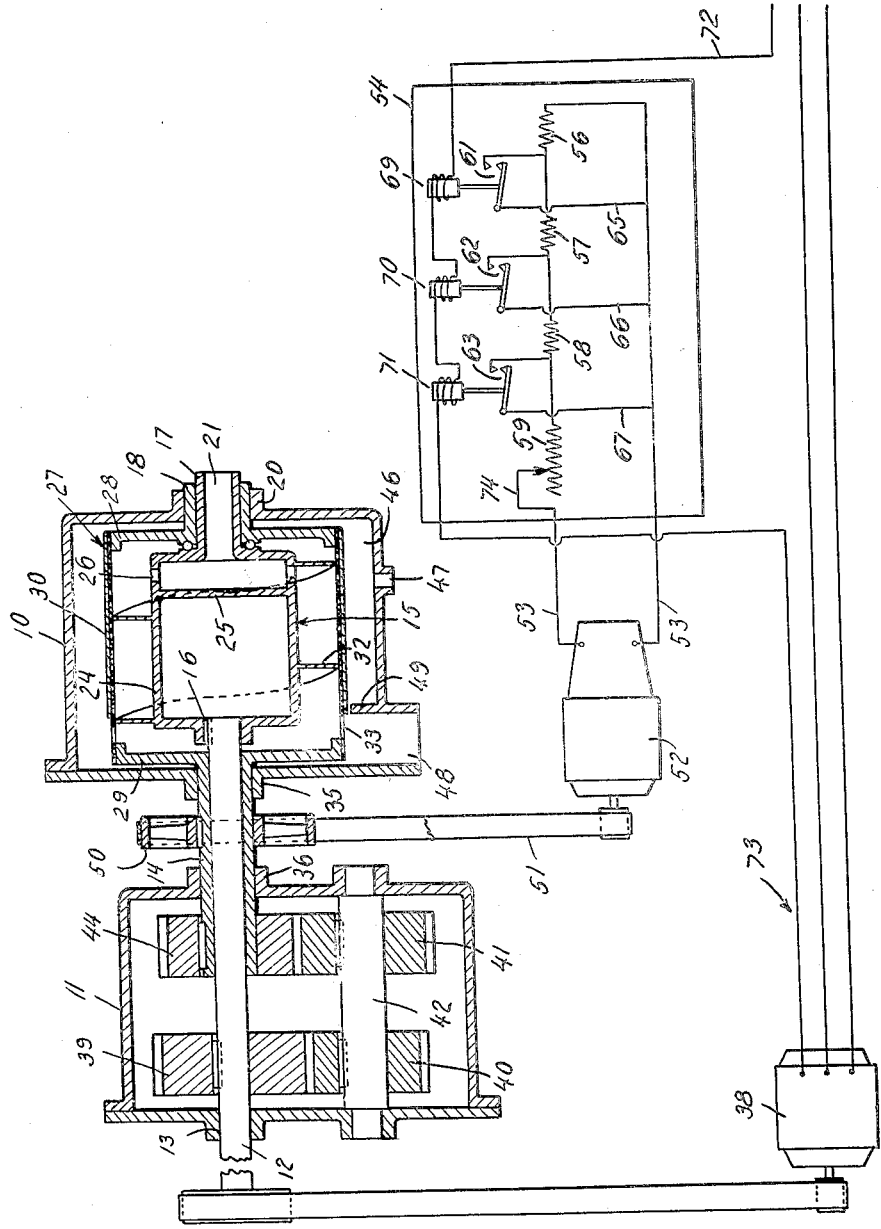
INVENTOR
Andrew M. Harkness
BY *Forbes Silsby*
ATTORNEY Patented Sept. 12, 1933

1,926,995

UNITED STATES PATENT OFFICE 1,926,995

FILTER

Andrew M. Harkness, Nyack, N. Y., assignor to General Chemical Company, New York, N. Y., a corporation of New York Application May 4, 1931. Serial No. 534,830

20 Claims. (Cl. 210—69)

This invention relates to filters, and is more particularly directed to improvements designed to eliminate, in the operation of a known type of continuous filter, difficulties which result in the necessity of frequent repacement of the driving gears.

Filters of the type to which the present invention relates usually comprise a rapidly rotating, horizontally disposed filter basket having therein a rotating conveyor which is rotated at a rate slightly in excess of that of the filter basket so as to cause the salt or solid particles being deliquored to be moved over the filter surface from the inlet to the discharge end of the filter chamber. The filter basket and the conveyor therein are both, as a rule, driven by a single main shaft which is connected at one end to a suitable source of power, and at the opposite end, connected directly to the conveyor. The basket, however, is driven from the main shaft through a set of gears which maintain relatively different rates of rotation between the conveyor and the basket, so that the basket is rotated at a rate slightly less than that of the conveyor. The conveying element and the face of the filtering surface are adjacent each other, and when filtering some salts or solid materials which have a tendency to pack, a tremendous friction is developed between the conveyor, the salt and the filtering surface with the result that a clutching effect is created which acts to cause the more slowly moving filter basket to be driven by the conveyor rather than by the basket driving gears. While in operation, there is a constant tendency for the conveyor to drive the basket, and where the solids being filtered readily pack, the friction created between the conveyor and the basket, in conjunction with the small differential between the rates of rotation of the basket and the conveyor give rise to a very high torque in the gears. This torque is so great as to produce a terrific strain and effect exceedingly rapid wear on the teeth of the reduction gears with consequent frequent breakage of gears and sometimes of the housings themselves.

It is the primary object of the present invention to eliminate breakage of the reduction gears with the attendant expense for replacements and interruption of production. Briefly considered, the invention comprises the application of a brake or a power absorbing unit connected to the basket of the filter between the filtering surface and the driving gears thereof so as to partially, or to any desired degree, absorb and prevent transmission to the basket driving gears of frictional clutching effects developed between the filtering surface, the salts and the conveyor, and thus eliminate or reduce to a large extent the great strain on the reduction gears arising from the friction created between the filtering surface, the salt thereon and the conveyor.

The invention is of such nature that the objects, advantages and features of novelty thereof will be more fully understood from a consideration of the following description taken in connection with the accompanying drawing which illustrates in section filtering elements and driving gears of a centrifugal filter, and further shows diagrammatically a brake or power absorbing unit for accomplishing the objects of the invention.

The centrifugal filters of the general type to which the present invention is applicable are well known in the art, and only so much of such constructions is shown in the drawing as is necessary for an appreciation of the present invention. It will be understood that the filter casing 10 and the gear housing 11 are sections of a frame supporting and maintaining all the operative parts of the apparatus in position.

The main or conveyor shaft 12 is journalled at one end in the gear housing 11 as at 13, and at an intermediate section in the tubular filter basket sleeve shaft 14. The right end of the solid section of the conveyor shaft fits into and is keyed to a conveyor drum 15 as indicated at 16. The opposite end of the drum 15 is formed to provide a tubular section 17 which is in effect an extension and a part of the conveyor shaft 12. The extension 17 is journalled in a sleeve 18 which in turn is rotatably mounted in the housing 10 as indicated at 20. The main exterior bearings for the left end of shaft 12 and for the right end of the tubular extension 17 and sleeve 18 are not shown. The axial opening 21 in the extension 17 constitutes an inlet passage through which salt solutions, sludges or any mixtures to be filtered are fed into the interior of the conveyor drum 15. The feed connections at the right end of the apparatus through which slurry is introduced into the opening 21 are not shown. The cylindrical wall 24 of the conveyor drum is provided between the partition 25 and inlet 21 with a series of openings 26 through which the slurry passes from the interior of the conveyor drum 24 into the annular chamber between the exterior of the conveyor drum 24 and the interior of the rotatable filter basket indicated generally by reference numeral 27.

The filter basket 27 comprises circular end plates 28 and 29 with a cylindrical perforated filtering surface 30 suitably attached at its ends to the peripheries of the end plates 28 and 29. Attached to the cylindrical exterior of the conveyor drum 15 is a helical conveyor screw 32 which serves, when the apparatus is in operation, to cause salt to move over the filtering surface 30 from the inlet end of the filter chamber to a series of openings 33 in the filtering surface 30 immediately adjacent the end of plate 29.

The filter basket sleeve shaft 14 is integral with or keyed to the filter basket end plate 29, and is journalled in the filter casing 10 and the gear housing 11 as indicated at 35 and 36 respectively. It will be understood that the construction of the basket 27 is such as to provide a strong, rigid cylinder having a perforated filtering surface 30, the filter basket itself being rotated through the sleeve shaft 14.

The conveyor 32 is rotated by the shaft 12 which may be belt driven by a motor 38. Motion is transmitted to the filter basket 27 through gear 39 keyed to the shaft 12, gears 40 and 41 keyed to the jack shaft 42 suitably journalled in the gear housing 11, and through the gear 44 which is keyed to the sleeve shaft 14 and meshes with the gear 41.

The ratios of the gears in the gear casing 11 are such that the conveyor is rotated at a speed slightly greater than that of the basket 27, so that salt deposited on the interior face of the filtering surface 30 is slowly moved over such surface from the right end of the filter chamber to the outlets 33 adjacent the end plate 29. In practice, the speed of rotation of the conveyor is in the neighborhood of 750 revolutions per minute, and the gear ratios in the gear casing 11 are chosen so that basket 27 rotates at a speed of about say 6 to 16 revolutions per minute less than that of the conveyor.

The normal operation of the filter as thus far described, and in accordance with the prior practice, is as follows: When the motor is started up, the conveyor drum and the conveyor screw 32 are rotated at about 750 revolutions per minute, and the basket 27 is driven through the gears in housing 11 at a somewhat slower rate as above noted. The salt solutions or slurries to be filtered are fed into the interior of the conveyor drum 15 through the inlet 21. The slurry immediately passes through the several openings 26 in the cylindrical surface of the drum 15 into the interior of the filter basket 27, and are thence thrown by centrifugal force against the inner face of the filtering surface 30. As is usual, the liquid separates and passes through the perforated filtering surface into the interior of the casing 10. The liquids collect in the bottom of the casing in space 46, and are withdrawn therefrom through the liquor outlet 47. As the screw 32 rotates at a rate slightly faster than that of the rotating basket 27, solids collecting on the inner face of the filtering surface 30 are gradually worked toward the left end of the basket, and are discharged from the basket through the openings 33, and from the casing through the salt outlet 48. Separation of the liquor in the space 46 and the salt passing from the casing 10 through the outlet 48 is maintained by the vertically extending partition 49.

It will be seen that when the conveyor and the filter basket are rotating and no salt is being filtered, the conveyor and the filter basket are both driven elements, the conveyor being driven directly through the main shaft 12 and the basket being driven at a slightly slower rate through the main shaft 12, the sleeve shaft 14 and the interposed gears in the gear housing 11. However, when filtering materials particularly salts which, when wet or moist, tend to pack the following conditions exist. The conveyor must necessarily be rotated slightly faster than the filter basket in order to effect discharge of the filtered salt. When the space between the exterior of the conveyor drum 15 and the inner face of the filtering surface 30 is partially filled with salt or solid material, a great amount of friction is developed between the screw, the salt and the filtering surface. The friction thus developed is sufficient to create a clutching effect between the conveyor and the filter basket with the result that the conveyor, revolving faster than the filter basket, tends to drive the filter basket. At the instant this clutching effect takes place, the filter basket 27, sleeve shaft 14 and the gears 39, 40, 41 and 44 are immediately transformed from driving members to driven members. Hence, the gears instead of acting to drive the filter basket 27 are themselves driven through the conveyor and filter basket, and consequently must act as brakes to overcome the clutching effect arising from the friction developed between the screw, the salt being filtered, and the inner face of the filter basket 27. Because of this friction and the small differential between the rates of rotation of the basket and the conveyor, the strain set up in the teeth of the gears is so great as to be dangerously near the shearing value. The gears in the casing 11 are large and expensive, and under some operating conditions, for example where trisodium phosphate salt solutions are being deliquored, the wear on the gears 39, 40, 41 and 44 is so great that replacement is frequently required every few months. The difficulties arising because of the conditions existing within the filter chamber have been heretofore fully recognized as present, but have been considered from the viewpoint of a gear problem, and attempts have been made to overcome the difficulties by specially designed and hardened gears. Such attempts have been entirely unsuccessful, and according to the present invention, the problem is approached from a totally different angle.

According to the present invention this constant breakage of gears, and some times of the gear housings, is overcome by the application of a frictional load applied to the sleeve shaft 14 of the filter basket which load acts to retard the rotation of the filter basket and absorb some of the torque set up by the clutching effect between the conveyor and filter basket, thus relieving the gears in the gear housing of the tremendous strain to which they are ordinarily subjected.

The objects and purposes of the invention may be carried into effect by the use of several mechanical appliances, one specific embodiment only being illustrated in the drawing. A pulley 50 is keyed to the sleeve shaft 14 between the filter casing 10 and the gear housing 11. The pulley 50 is connected through a belt 51 to the shaft of a generator 52. The output circuit 53 of the generator 52 includes a rheostat shown diagrammatically on the drawing and indicated by the reference numeral 54. The rheostat comprises resistances 56, 57, 58 and 59 which are so arranged as to be cut out of or into the output circuit 53 by operation of switches 61, 62 and 63 in the cross connectors 65, 66 and 67. The switches 61, 62 and 63 are respectively actuated by solenoids 69, 70 and 71. The coils of the solenoids are included in a conductor 72 which constitutes one lead of the power line 73 feeding the motor 38. The rheostat 54 also includes a manual adjustment 74 which may be employed to facilitate regulation within reasonable limits, of the total resistance of the rheostat. It will be understood from a consideration of the drawing that when the switches 61, 62 and 63 are closed in the order named, the resistances 56, 57 and 58 are successively cut out of the output circuit 53 with the result that with each reduction of resistance in the rheostat, a proportionally greater amount of energy is required to operate the generator 52. It will be understood that all parts of the rheostat 54 are of standard construction, and specifically form no part of the present invention.

The operation of the filter in accordance with the present invention is as follows: For purposes of illustration, let it be assumed that when the sleeve shaft 14 is not connected to the generator and the filter basket is empty, about 20 H. P. is required to rotate the filter basket and H. P. is required to rotate the filter basket and operating the conveyor. Further assume when operating and filtering under normal conditions encountered in the usual practice, the filter basket not being connected to the generator 52 as is the case in the present invention, that about 45 H. P. is required to rotate the filter basket and the conveyor. It will be recalled from the above description that when the conveyor and basket are rotating and filtering material, the conveyor at all times tends to drive the filter basket 27 through the salt friction between the conveyor and basket with the result that when the filter is in operation, the gears in the housing 11 are driven by the basket instead of operating as driving members for the basket. If 20 H. P. is required to turn the filter while empty and 45 H. P. is required to rotate the same when operating under usual conditions encountered in practice, it will be seen that the reaction against the normal following faces of the teeth of the gears in the housing 11 is 25 H. P. The primary purpose of the present invention is to greatly reduce or eliminate such excessive strain on the gears. This object is accomplished by applying to the sleeve shaft 14 a brake which prevents, wholly or partially, the transmission to the gears in the housing 11 of the full effect of the friction developed between the conveyor, the salt and the filtering surface. In the present embodiment of the invention this result is brought about by causing the sleeve shaft 14 to drive the generator 52. It will be seen that whatever energy is required to operate the generator, and is transmitted thereto through the pulley 50 and the belt 51, is thus diverted from and is not transmitted to the gears in the housing 11.

For further purpose of illustration, it may be assumed that the resistance in the rheostat 54 is such that when switches 61, 62 and 63 are open, about 5 H. P. is required to operate the generator 52. Hence, when conditions in the filter are such that the reaction on the following faces of the gears in the housing 11 is 25 H. P. as above assumed, and rheostat 54 is adjusted so that 5 H. P. is required to operate the generator 52, the net reaction on the following faces of the gears 39, 40, 41 and 44 would be 20 H. P., with the result that the reaction on the gears is reduced by the amount of energy required to operate the generator 52.

When operation is commenced, the slimes to be filtered are fed into the opening 21. Before there is any material accumulation of salt on the inner face of the filtering surface, there is practically no tendency on the part of the conveyor to drive the filter basket. However, as soon as a layer of solid material is built up on the face of the filter surface, friction between the conveyor and the filtering surface is created, and this friction increased proportionally with the quantity of material between the outer face of the conveyor drum 24 and the inner face of the filtering surface 30, due regard being had for the nature of the salt or solid material being filtered. If this salt is such that it readily packs, the friction between the conveyor and the inner face of the filter surface is much greater than in the case where the salt is not so inclined to pack.

As the load in the filter basket and the friction between the conveyor, the salt and the inner face of the filter basket increases, there is a greater tendency on the part of the conveyor to drive the basket 27 and at the same time proportionally increase the reaction on the following faces of the gears in the housing 11. At the same time, a proportionally greater quantity of current is required by the motor 38 to turn the filter because of the increased clutching effect between the basket and conveyor. The solenoids 69, 70 and 71 may be so adjusted as to close the associated switches 61, 62 and 63 successively when increasingly larger quantities of current are required to drive the motor 38. Accordingly, when friction between the conveyor and the inner face of the filter basket increases, more energy is required to drive the motor 38. When the quantity of current required by the motor becomes sufficient to cause solenoid 69 to close the switch 61, the resistance 56 is cut out, and the total resistance of the rheostat is reduced by that amount. With a reduction of resistance in the rheostat 54, a correspondingly greater amount of energy is required to drive the generator 52, with the result that the braking effect of generator on shaft 14 is that much greater. When the friction in the filter rises still higher, a yet greater quantity of current is required by the motor 38, and the adjustment of the solenoid 70 is such that it then closes the switch 62 thus cutting out the resistance 57, and further reducing the total resistance of the rheostat. On a further increase of friction in the filter chamber, more current is needed by motor 38, and the solenoid 71 closes the switch 63, cutting out the resistance 58 and again reducing the total resistance of the rheostat. Consequently, as friction between the conveyor and the basket rises, thus increasing the reaction and strain on the gears, the current required by the drive motor 38 proportionally increases. As the current requirements for motor 38 rise, the resistance in the rheostat 54 is proportionally decreased and the braking effect of the generator on the shaft 14 is proportionally increased. The net result is that the greater the clutching effect between the conveyor and the interior of the basket, which in the absence of the present invention would proportionally increase the reaction on the gears, the greater is the braking effect of the generator which in this manner diverts from the gears the increases of friction within the filter.

It is obvious that the rheostat 54 may be so constructed as to include any total resistance desirable, and any number of switches and actuating solenoids to successively reduce the resistance of the rheostat as required. In the present illustration, assuming as before that when switches 61, 62 and 63 are opened, the resistance of rheostat 54 is such as to require 5 H. P. to drive the generator, the individual resistances in the rheostat might be so arranged that when switch 61 is closed and resistance 56 is cut out of the output circuit, about 8 H. P. would be required to operate the generator. Similarly, the resistances may be so chosen that when switches 62 and 63 are successively closed, about 11 and 15 H. P. respectively would be required to drive the generator.

Accordingly, whatever may be the amount of the reaction against the gears in the gear housing 11, such reaction may be reduced wholly or partially by the application of sufficient braking power to the sleeve shaft 14. It will be apparent, of course, that by applying braking power to the sleeve shaft 14, more energy is required to operate the filter and the cost of filtering is increased. Therefore, it is to advantage to apply to the sleeve shaft 14 only so much braking power as is necessary to overcome the greater part of the strain and reaction imposed upon the following faces of the gears in the gear housing. Hence, it is ordinarily desirable to apply to the sleeve shaft 14 only sufficient braking effect as is necessary to reduce the strain on the gears to within reasonably safe limits. Based on the assumption that when the filter is in normal operation in accordance with prior practice and in the absence of the present invention, the reaction of the gears is about 25 H. P., it may be quite sufficient to apply to the sleeve shaft 14 through the generator 52 a braking effect of about 15 H. P., thus reducing the strain on the driving gears about 60%. While by the present invention the degree of friction developed between the conveyor and the filter basket is not decreased, the full reaction of this frictional clutching effect is not transmitted to the gears in the housing 11 for the reason that it may be absorbed to any desired extent by the generator 52. While more power is required to operate the filter in accordance with the present invention, the cost of the additional power is entirely offset by the great saving in replacement costs of the driving gears.

Several other forms of brakes might be applied to the filter basket to partially or fully absorb the friction developed between the conveyor and the filtering surface. For example, the pulley 50 might be connected to the rotor of a standard hydraulic dynamometer, and the resistance offered by the dynamometer to the turning effect of the sleeve shaft 14 may be regulated by automatic control of the by-pass valves of the dynamometer by suitable electrical means actuated by current variations in the motor power line 73. Similarly, a magnetic brake may be applied to the sleeve shaft 14, and the braking effect thereof automatically controlled by the current in the power line 73. On the other hand, it is not necessary that the braking effect applied to shaft 14 be automatically controlled. For example, the resistance of the rheostat 54 might be regulated by hand. Furthermore, it is possible under some circumstances to employ a power absorber which is not adjustable. This might be particularly desirable in instances where one material or salt is being filtered and the conditions within the filter chamber are more or less constant. In such case a centrifugal pump might be connected to the pulley 50, and for any one pump, the braking effect thereof on the sleeve shaft 14 would be constant. It may also be feasible in some circumstances to insert a motor in the output circuit of the generator 52 and through such motor drive a pump feeding slurry to the filter. In this situation, the output circuit of the generator may be provided with a manually or automatically operated rheostat for adjusting the braking effect of the generator on the sleeve shaft 14. In this manner, the added power cost of operating the system may be offset to some extent by utilizing the energy developed by the generator for pumping slurry into the filter chamber.

It will be understood that the invention is not limited to use in conjunction with the exact type of filter disclosed in the drawing. The invention is equally applicable to an apparatus, such for example as where the filter basket or filter surface is driven at a slightly greater rate than the conveyor, in which case it is only necessary in order to accomplish the purpose of the invention to apply braking power to the more slowly moving element, i. e., in the situation supposed, to the conveyor.

In the appended claims, the term "salt" is intended to designate any filterable material.

I claim:

1. A filter comprising a movable filtering surface and means for driving said surface, a conveyor for moving salt to be filtered over said filtering surface, means for driving said conveyor, and means for preventing the transmission to the filter surface driving means of at least some of the frictional clutching effects developed between the filtering surface, the salt thereon and the conveyor as tend to transform the filter surface driving means from a driving member to a driven member.

2. A filter comprising a movable filtering surface and means for driving said surface, a conveyor for moving salt to be filtered over said filtering surface, means for driving said conveyor, and means comprising a brake operatively associated with the filter surface for preventing the transmission to the filter surface driving means of at least some of the frictional clutching effects developed between the filtering surface, the salt thereon and the conveyor as tend to transform the filter surface driving means from a driving member to a driven member.

3. A filter comprising a movable filter surface, a conveyor for moving salt to be filtered over the filter surface, means for driving the filter surface and the conveyor through driving connections associated respectively with the filter surface and the conveyor, and means for preventing the transmission to the filter surface driving connection of at least some of the frictional clutching effects developed between the filtering surface, the salt thereon and the conveyor as tend to transform the driving connection associated with the filter surface from a driving member to a driven member.

4. A filter comprising a movable filter surface, a conveyor for moving salt to be filtered over the filter surface, means for driving the filter surface and the conveyor through driving connections associated respectively with the filter surface and the conveyor, and means comprising a brake interposed between the filter surface and the filter surface driving connection for preventing the transmission to the filter surface driving connection of at least some of the frictional clutching effects developed between the filtering surface, the salt thereon and the conveyor as tend to transform the driving connection associated with the filter surface from a driving member to a driven member.

5. A filter comprising a pair of elements consisting of a movable filter surface and a conveyor, means for driving the filter surface and means for driving the conveyor, one of said driving means being constructed and arranged so as to drive its associated element at a rate slower than the other element is driven by its driving means, and means for preventing the transmission to the driving means of the more slowly driven element of at least some of the frictional clutching effects developed between the filter surface, the salt thereon and the conveyor as tend to transform the driving means of the more slowly driven element from a driving member to a driven member.

6. A filter comprising a pair of elements consisting of a movable filter surface and a conveyor, means for driving the filter surface and means for driving the conveyor, one of said driving means being constructed and arranged so as to drive its associated element at a rate slower than the other element is driven by its driving means, and a brake operatively associated with the more slowly driven element for preventing the transmission to its driving means of at least some of the frictional clutching effects developed between the filter surface, the salt thereon and the conveyor as tend to transform the driving means of the more slowly driven element from a driving member to a driven member.

7. A filter comprising a movable filter surface and means for driving the filter surface, a conveyor and means for driving the conveyor at a rate greater than the filter surface is driven so as to effect relative movement between the filter surface and the conveyor whereby salt to be filtered is moved over the filter surface, and means for preventing the transmission to the filter surface driving means of at least some of the frictional clutching effects developed between the filtering surface, the salt thereon and the conveyor as tend to transform the filter surface driving means from a driving member to a driven member.

8. A filter comprising a movable filter surface and means for driving the filter surface, a conveyor and means for driving the conveyor at a rate greater than the filter surface is driven so as to effect relative movement between the filter surface and the conveyor whereby salt to be filtered is moved over the filter surface, and a brake interposed between the filter surface and its driving means for preventing the transmission to the filter surface driving means of at least some of the frictional clutching effects developed between the filtering surface, the salt thereon and the conveyor as tend to transform the filter surface driving means from a driving member to a driven member.

9. A filter comprising a movable filter surface and means for driving the filter surface, a conveyor and means for driving the conveyor at a rate greater than the filter surface is driven so as to effect relative movement between the filter surface and the conveyor whereby salt to be filtered is moved over the filter surface, braking means for preventing the transmission to the filter surface driving means of at least some of the frictional clutching effects developed between the filtering surface, the salt thereon and the conveyor as tend to transform the filter surface driving means from a driving member to a driven member, and means for applying the braking means substantially proportionally to the degree of friction developed between the conveyor, the salt and the filter surface.

10. A filter comprising a pair of elements consisting of a movable filter surface and a conveyor, means for driving the filter surface and means for driving the conveyor, one of said driving means being constructed and arranged so as to drive its associated element at a rate slower than the other element is driven by its driving means, means for preventing the transmission to the driving means of the more slowly driven element of at least some of the frictional clutching effects developed between the filter surface, the salt thereon and the conveyor as tend to transform the driving means of the more slowly driven element from a driving member to a driven member, and means for actuating said last mentioned means substantially proportionally to the degree of friction developed between the conveyor, the salt and the filter surface.

11. A centrifugal filter comprising a rotatable filter basket and means for rotating the basket, a conveyor and means for driving the conveyor to move salt to be filtered over the filter surface of the basket, and means for preventing the transmission to the basket driving means of at least some of the frictional clutching effects developed between the filter surface of the basket, the salt thereon and the conveyor as tend to transform the basket driving means from a driving member to a driven member.

12. A centrifugal filter comprising a rotatable filter basket, a conveyor for moving salt to be filtered over the filter surface of the basket, means for driving the basket and the conveyor through driving connections associated respectively with the basket and the conveyor, braking means interposed between the basket and the basket driving connection for preventing the transmission to the basket driving connection of at least some of the frictional clutching effects developed between the filter surface of the basket, the salt thereon and the conveyor as tend to transform the driving connection associated with the filter basket from a driving member to a driven member.

13. A centrifugal filter comprising a rotatable filter basket and means for rotating the basket, a conveyor in the basket and means for driving the conveyor at a rate greater than that at which the basket is driven so as to effect relative movement between the filter surface of the basket and the conveyor whereby salt to be filtered is moved over the filter surface of the basket, and means for preventing transmission to the basket rotating means of at least some of the frictional clutching effects developed between the filter surface of the basket, the salt thereon and the conveyor as tend to transform the basket rotating means from a driving member to a driven member.

14. A centrifugal filter comprising a rotatable filter basket and means for rotating the basket, a conveyor in the basket and means for driving the conveyor at a rate greater than that at which the filter basket is driven so as to effect relative movement between the filter surface of the filter basket and the conveyor whereby salt to be filtered is moved over the filter surface of the filter basket, and a brake connected with the basket for preventing transmission to the basket rotating means of at least some of the frictional clutching effects developed between the filter surface of the basket, the salt thereon and the conveyor as tend to transform the basket rotating means from a driving member to a driven member.

15. A centrifugal filter comprising a rotatable filter basket and means for rotating the basket, a conveyor in the basket and means for driving the conveyor at a rate greater than that at which the filter basket it driven so as to effect relative movement between the filter surface of the filter basket and the conveyor whereby salt to be filtered is moved over the filter surface of the filter basket, a brake connected with the basket for preventing transmission to the basket rotating means of at least some of the frictional clutching effects developed between the filter surface of the basket, the salt thereon and the conveyor as tend to transform the basket rotating means from a driving member to a driven member, and means for applying the braking means to the basket substantially proportionally to the degree of friction developed between the conveyor, the salt and the filter surface of the basket.

16. A centrifugal filter comprising a rotatable filter basket, a conveyor in the basket, a motor for rotating the basket and the conveyor through driving connections associated respectively with the basket and the conveyor, the driving connection associated with the basket being so constructed and arranged as to rotate the basket at a rate slower than that of the conveyor whereby the salt to be filtered is moved over the filter surface of the basket, a brake connected to the basket between the filter surface and the driving connection of the basket, electrically operated means actuated by variations in the current influence of the brake so as to prevent transmission to the basket driving means of at least some of the frictional clutching effects between the filter surface of the basket, the salt and the conveyor as tend to transform the basket driving connection from a driving to a driven member.

17. A centrifugal filter comprising a rotatable filter basket, a conveyor in the basket, a motor for rotating the basket and the conveyor through driving connections associated respectively with the basket and the conveyor, the driving connection associated with the basket being so constructed and arranged as to rotate the basket at a rate slower than that of the conveyor whereby the salt to be filtered is moved over the filter surface of the basket, a generator connected to the basket between the filter surface and the driving connection of the basket, an output circuit for the generator having a resistance therein, electrically operated means actuated by variations in the current operating the motor for regulating the resistance to control the retarding influence of the generator on the basket in accordance with such current variations thereby to prevent transmission to the basket driving means of at least some of the frictional clutching effects between the filter surface of the basket, the salt and the conveyor as tend to transform the basket driving connection from a driving to a driven member.

18. A centrifugal filter comprising a rotatable filter basket and means for rotating the basket, a rotatable conveyor and means for rotating the conveyor, one of said rotating means being constructed and arranged so as to rotate its associated element at a rate slower than the element is rotated by its rotating means, and means for preventing the transmission to the rotating means of the more slowly rotated element of at least some of the frictional clutching effects developed between the filter surface, the salt thereon and the conveyor as tend to transform the rotating means of the more slowly rotated element from a driving member to a driven member.

19. In an apparatus having a pair of movable elements operating under conditions tending to develop friction between the two elements, the combination of means for driving each of said elements, the means driving one of said elements being constructed and arranged to drive its associated element at a rate slower than the other element is driven by its driving means whereby friction developed between the two elements tends to move the two elements in unison, and means for preventing the transmission to the driving means of the more slowly driven element of at least some of the frictional clutching effects developed between the two elements as tend to transform the driving means of the more slowly driven element from a driving member to a driven member.

20. In an apparatus having a pair of rotatable elements operating under conditions tending to develop friction between the two elements, the combination of means for rotating each of said elements, the means rotating one of said elements being constructed and arranged to rotate its associated element at a rate slower than the other element is rotated by its rotating means whereby friction developed between the two elements tends to rotate the two elements in unison, and means for preventing the transmission to the rotating means of the more slowly rotated element of at least some of the frictional clutching effects developed between the two elements as tend to transform the driving means of the more slowly rotated element from a driving member to a driven member.

ANDREW M. HARKNESS.

CERTIFICATE OF CORRECTION.

Patent No. 1,926,995.            September 12, 1933.

ANDREW M. HARKNESS.

It is hereby certified that error appears in the printed specification of the above numbered patent requiring correction as follows: Page 6, line 31, claim 16, after "current" insert the words "operating the motor for controlling the retarding"; and that the said Letters Patent should be read with this correction therein that the same may conform to the record of the case in the Patent Office.

Signed and sealed this 24th day of October, A. D. 1933.

F. M. Hopkins (Seal)                                    Acting Commissioner of Patents.